US012574396B2

(12) United States Patent
Denis

(10) Patent No.: US 12,574,396 B2
(45) Date of Patent: Mar. 10, 2026

(54) METHOD FOR VEHICLE CONTROL BASED ON AN ANOMALY REPORT

(71) Applicant: VALEO COMFORT AND DRIVING ASSISTANCE, Créteil (FR)

(72) Inventor: Richard Denis, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 316 days.

(21) Appl. No.: 16/615,338

(22) PCT Filed: Jun. 18, 2018

(86) PCT No.: PCT/EP2018/066085

§ 371 (c)(1),
(2) Date: Nov. 20, 2019

(87) PCT Pub. No.: WO2018/229292

PCT Pub. Date: Dec. 20, 2018

(65) Prior Publication Data

US 2020/0205006 A1      Jun. 25, 2020

(30) Foreign Application Priority Data

Jun. 16, 2017    (FR) ...................................... 1755518

(51) Int. Cl.
*H04L 9/40* (2022.01)
*H04W 4/40* (2018.01)
*H04W 12/122* (2021.01)
*B60Q 9/00* (2006.01)

(52) U.S. Cl.
CPC ........... *H04L 63/1425* (2013.01); *H04W 4/40* (2018.02); *H04W 12/122* (2021.01); *B60Q 9/00* (2013.01)

(58) Field of Classification Search
CPC ............................. H04L 63/1425; H04W 4/40
USPC ........................................................... 726/23
See application file for complete search history.

(56) References Cited

U.S. PATENT DOCUMENTS

| | | | |
|---|---|---|---|
| 7,421,334 B2 | 9/2008 | Dahlgren et al. | |
| 8,909,415 B1 * | 12/2014 | Hawley ................... | H04W 4/38 701/32.3 |
| 9,813,911 B2 * | 11/2017 | Kong ................... | H04B 1/3822 |
| 10,665,040 B2 * | 5/2020 | Colvin ................... | G07C 5/085 |
| 2007/0213922 A1 | 9/2007 | Van Buer et al. | |
| 2010/0023201 A1 * | 1/2010 | Kinney ................. | G07C 5/008 701/1 |

(Continued)

FOREIGN PATENT DOCUMENTS

| | | | | | |
|---|---|---|---|---|---|
| EP | 2863257 A1 * | 4/2015 | ............. | G03B 15/00 |
| EP | 3136193 A1 * | 3/2017 | ......... | H04L 63/1425 |

(Continued)

OTHER PUBLICATIONS

International Search Report and Written Opinion corresponding to International Application No. PCT/EP2018/066085, mailed Jul. 18, 2018 (10 pages).

*Primary Examiner* — Bryan F Wright
(74) *Attorney, Agent, or Firm* — Osha Bergman Watanabe & Burton LLP

(57) ABSTRACT

A method for transmitting a report to a vehicle (10) comprises the following steps: —detecting, by a station (22), an anomaly relating to the vehicle; —transmitting to the vehicle (10) a report relating to the detected anomaly.

10 Claims, 2 Drawing Sheets

(56)     References Cited

U.S. PATENT DOCUMENTS

Figure 1:
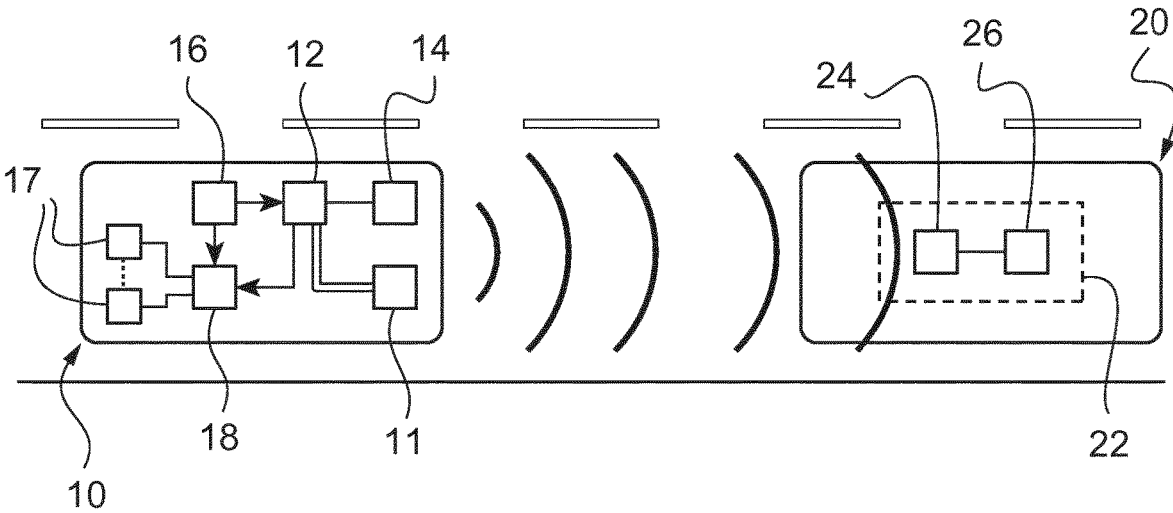

| | | | | |
|---|---|---|---|---|
| 2013/0282277 | A1* | 10/2013 | Rubin | G08G 1/16 |
| | | | | 701/517 |
| 2014/0143839 | A1* | 5/2014 | Ricci | H04N 21/814 |
| | | | | 726/4 |
| 2016/0334793 | A1* | 11/2016 | Celikkol | B63G 8/001 |
| 2017/0032671 | A1* | 2/2017 | Toyama | G06F 21/64 |
| 2017/0085437 | A1* | 3/2017 | Condeixa | H04L 43/06 |
| 2017/0213461 | A1* | 7/2017 | Murray | H04W 4/12 |
| 2017/0215046 | A1* | 7/2017 | Moebus | G01S 5/0263 |
| 2018/0004197 | A1* | 1/2018 | Feenstra | F01D 21/003 |
| 2018/0052463 | A1* | 2/2018 | Mays | B60W 60/007 |
| 2018/0118219 | A1* | 5/2018 | Hiei | B60W 50/14 |
| 2018/0356837 | A1* | 12/2018 | Lisewski | H04L 9/3234 |

FOREIGN PATENT DOCUMENTS

| | | | | | |
|---|---|---|---|---|---|
| EP | 3249626 | A1 * | 11/2017 | | B60R 16/023 |
| WO | 2013/087514 | A1 | 6/2013 | | |
| WO | WO-2015180931 | A1 * | 12/2015 | | B60W 10/18 |
| WO | WO-2016116977 | A1 * | 7/2016 | | B60R 16/023 |
| WO | WO-2017104112 | A1 * | 6/2017 | | H04L 67/12 |

* cited by examiner

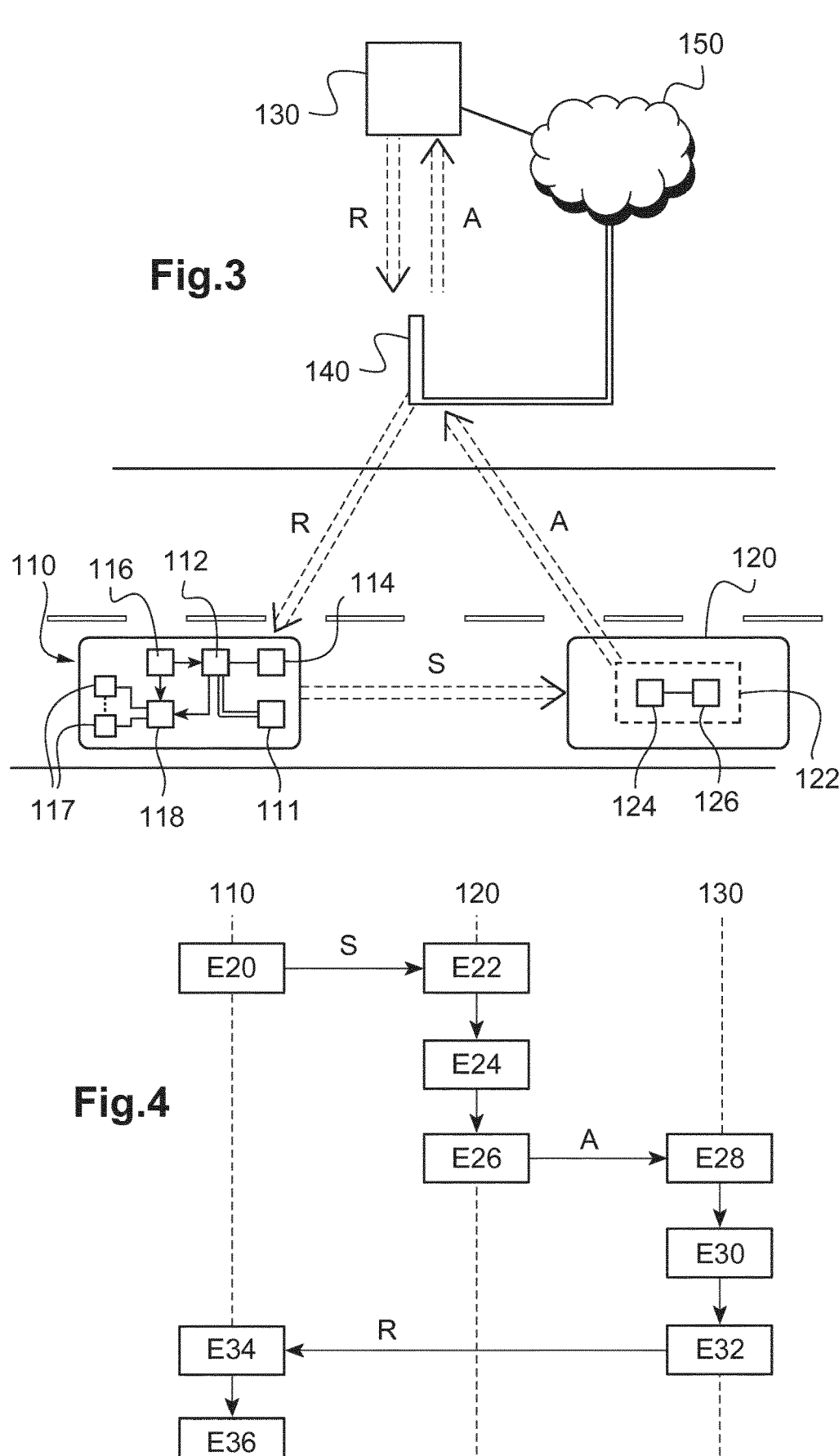

METHOD FOR VEHICLE CONTROL BASED ON AN ANOMALY REPORT

TECHNICAL FIELD TO WHICH THE INVENTION RELATES

The present invention relates to vehicles which are provided with on-board systems which are capable of being subjected to data-processing attacks and the protection against such data-processing attacks.

It relates more particularly to a data exchange method between a vehicle and a station.

TECHNOLOGICAL BACKGROUND

Vehicles (in particular motor vehicles) nowadays use to an increasing extent on-board electronic systems for ensuring various functionalities which may extend as far as autonomous driving of the vehicle.

These vehicles may further exchange data with each other or with other types of stations, such as road infrastructure items or various electronic devices (for example, a smartphone carried by a pedestrian), for example, by means of communication systems which are generally referred to as "V2X".

Such vehicles may consequently be subjected to data-processing attacks which target their on-board systems and there is consequently provision to fit these vehicles with a protection system against data-processing attacks.

OBJECT OF THE INVENTION

In this context, the present invention sets out a method for transmitting a report to a vehicle comprising the following steps:

detecting by means of a station an anomaly relating to the vehicle;

transmitting to the vehicle a report relating to the anomaly detected (directly or indirectly in relation to the station, as explained below).

Such an anomaly, which is present, for example, in data transmitted by the vehicle, may originate from a residual data-processing attack which is not detected by the above-mentioned protection system, or from an inappropriate action of this protection system. Thus, the vehicle can take account of the anomaly which is detected by the station and which is signaled in the report in order to take the necessary steps and to protect itself from this potential residual attack.

According to other features which may optionally be envisaged (and which are therefore non-limiting):

the method comprises a step of receiving, by the station and via a wireless communication between the station and the vehicle, data from the vehicle;

the anomaly detected by the station is an anomaly within the data (from the vehicle);

the anomaly detected by the station is (in a variant) an abnormal and/or unusual and/or suspicious physical behavior of the vehicle, this physical behavior being detected by the station;

the report is transmitted via a wireless communication between the station and the vehicle (in practice, via the wireless communication mentioned above or optionally via another wireless communication between the station and the vehicle);

the report is transmitted to the vehicle by a remote server;

the remote server is configured to transmit a message which is intended for the driver or the owner of the first vehicle and which signals the anomaly detected;

the station is configured to transmit an anomaly detection message to the remote server;

the remote server is configured to process a plurality of anomaly detection messages which are received from a plurality of stations, respectively, and to derive the report therefrom;

the method comprises a step of carrying out an action within the vehicle following reception of the report;

the action comprises deactivating and/or isolating (in other words, placing into quarantine) an on-board system which is affected by an attack;

the action comprises stopping the transmission of data via a wireless communication (for example, the wireless communication between the station and the vehicle);

the action comprises switching to a secure configuration of the protection system against the above-mentioned attacks;

the action comprises a step of updating a software item which is on-board the vehicle;

the action comprises switching a functionality of the vehicle (for example, a functionality involving autonomous driving) to a secure operating mode (or to a degraded operating mode);

the action comprises a step of inhibiting automatic actions carried out by the vehicle;

the method comprises a step of transmitting a warning message inside the vehicle (which message is intended for the driver of the vehicle and/or a passenger of the vehicle);

the report comprises an identifier of the anomaly which is detected or a type of the anomaly detected;

the report comprises a confidence level which is associated with the anomaly detected;

the report comprises a recommended action and/or a measurement of the capacity for anomaly detection of the station and/or proof of the anomaly detected and/or information items relating to the vehicle (vehicle affected);

the station is fitted to another vehicle;

the station is fitted to a road infrastructure item;

the station is fitted to a portable electronic device (such as a smartphone) which is carried, for example, by a pedestrian.

DETAILED DESCRIPTION OF AN EMBODIMENT

The following description in relation to the appended drawings, which are given by way of non-limiting example, will afford a clear understanding of what the invention involves and how it can be carried out.

Figure 2:
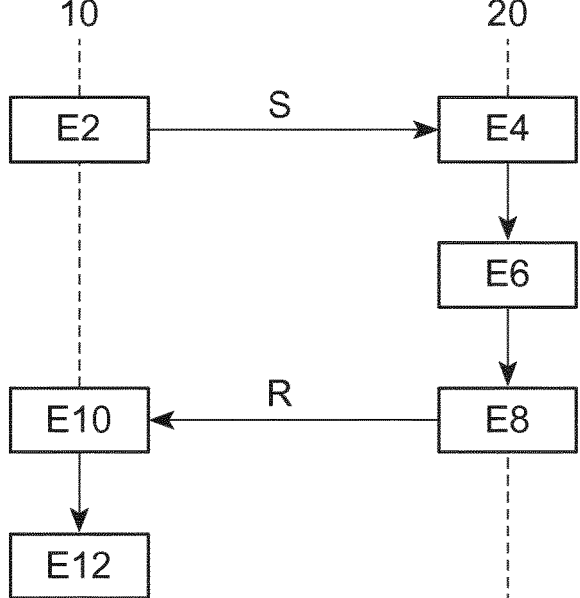

In the appended drawings:

FIG. 1 schematically illustrates a first example of the context for carrying out the invention;

FIG. 2 illustrates an example of the method carried out in the context of FIG. 1;

FIG. 3 schematically illustrates a second example of the context for carrying out the invention; and FIG. 4 illustrates an example of the method carried out in the context of FIG. 3.

FIG. 1 illustrates a first vehicle 10 and a second vehicle 20 which here use the same traffic lane.

Only the elements of these vehicles 10, 20 which are advantageous for understanding the invention are described below.

The first vehicle 10 comprises a control unit 12, a wireless communication module 14, a navigation system 16 and an autonomous driving system 18.

The first vehicle 10 also comprises a system 11 for protection against attacks and sensors 17 (for example, radars and/or cameras).

The control unit 12 (produced, for example, in practice by a microcontroller or, in a variant, distributed over a plurality of on-board systems) is configured to administer and coordinate the operation of the other equipment items of the vehicle, in particular as described below.

The wireless communication module 14 is configured to establish wireless communications with adjacent stations, these stations being fitted, for example, to another vehicle (as described below) or a road infrastructure item, or a portable electronic device which is carried where applicable by a pedestrian.

The navigation system 16 in turn comprises in particular a positioning system which supplies information which indicates the position of the first vehicle (for example, in the terrestrial reference frame) and where applicable a time information item (absolute time).

The autonomous driving system 18 is configured to carry out the movement of the first vehicle 10 without any intervention by the driver thereof. To this end, the autonomous driving system controls driving members of the first vehicle 10 (for example, a motive power unit and/or a braking system and/or a steering control system) in accordance with information items received from different sensors with which the first vehicle 10 is fitted and which supply data which describe the environment of the first vehicle 10.

The system 11 for protection against attacks (or CDS/ Cyber Defense System) allows detection and processing of data-processing attacks which are capable of occurring within the first vehicle 10, in particular as a result of the data exchanges carried out with external devices by means of the wireless communication module 14. In a variant, this protection system could be distributed within different elements 12, 14, 16, 18.

The second vehicle 20 is provided with a station 22 which comprises a wireless communication unit 26 and an anomaly detection unit 26.

Such a station 22 thus incorporates a wireless telecommunication functionality with other entities, for example, with other stations of the same type. The station 22 is, for example, an ITS station (Intelligent Transport System), as defined by the standard ETSI EN 302 665.

The communication unit 24 is particularly capable of establishing a wireless communication with the wireless telecommunication module 14 of the first vehicle 10 when the first vehicle 10 and the second vehicle 20 are close to each other (typically at a distance of several hundreds of meters, for example, a distance less than a maximum distance between 300 m and 1 km, that is to say, if the communication were relayed by intermediate stations).

As explained in greater detail below, the anomaly detection unit 26 analyzes data S which are received by the second vehicle 20 from the first vehicle via the wireless communication established in this manner, verifies the consistency of these data and instructs the transmission of a report R to the first vehicle 10 (here, always via the communication established or, in a variant, via another wireless communication carried out between the first vehicle

10 and the station 22 by alternative communication means) in the event of detection of an anomaly within these data.

FIG. 2 illustrates an example of a method carried out in the context which has been described above.

This method begins at step E2 by transmitting data S by means of the first vehicle 10 to the second vehicle 20 and via the communication established between the wireless communication module 14 and the wireless communication unit 24.

These data S are, for example, data which are transmitted during normal operation by the first vehicle 10, such as:

state data, for example, the position of the first vehicle 10 (as determined by the navigation system 16) and/or the orientation of the first vehicle (as determined by the navigation system 16 and/or the sensors 11) and/or the speed of the first vehicle 10 and/or the acceleration of the first vehicle 10 and/or the on/off state of at least one lighting device or signaling device and/or the position (typically the angle) of the steering wheel of the first vehicle 10 and/or a history of the route followed by the first vehicle 10 and/or the time stamp of the above-mentioned data (this time stamp being able to be carried out by means of the above-mentioned time information item supplied by the navigation system 16);

data for signaling danger, for example, signaling an accident or a breakdown or a dangerous zone (such as slippery road) or a weather phenomenon (such as fog) or a traffic congestion region or the presence of an object on the carriageway.

These data S are thus received by the second vehicle 20 (via the wireless communication unit 24) at step E4.

The anomaly detection unit 26 can thus analyze at step E6 these data S in order to in particular verify the consistency thereof and to detect an anomaly, where applicable.

Such an anomaly may in particular be caused by a residual data-processing attack within one of the above-mentioned elements 11, 12, 14, 16, 17, 18 of the first vehicle 10. The term "residual data-processing attack" is intended to refer to a data-processing attack which has not been (correctly) dealt with by the protection system mentioned above. Such an anomaly may also be caused by an unsuitable action or reaction of this protection system.

The anomaly detection unit 26 can thus, for example, detect an anomaly (that is to say, an inconsistency) in the position of the first vehicle 10 (information received among the data S) by comparing this position with the position information items received beforehand from the first vehicle 10 and/or the position of the second vehicle 20 (as determined by systems belonging to the second vehicle 20).

This is because, during normal operation, the position of the first vehicle indicated by the data S received should not substantially differ (for example, by more than 100 km) from the position information items previously received from the first vehicle 10 or the position of the second vehicle 20.

The anomaly detection unit 26 can naturally analyze and verify the consistency of other types of data. For example, the anomaly detection unit 26 can compare the speed of the first vehicle 10 indicated in the data S received with the speed of the first vehicle 10 as measured by sensors which are fitted to the second vehicle 20.

In a variant, the anomaly detected could be an abnormal behavior (and/or unusual and/or suspicious behavior) of the first vehicle 10 (for example, the fact of travelling very slowly on the motorway and/or travelling without lights at night) detected by the station 22.

The anomaly detection unit 26 can thus instruct at step E8 the transmission, by the wireless communication unit 24 to the first vehicle 10 (via the wireless communication established between the wireless communication module 14 and the wireless communication unit 24), of a report R which contains at least some of the following information items:

an information item relating to the first vehicle 10, for example, an information item which identifies the first vehicle 10, such as an identifier of the first vehicle 10 which is contained in the above-mentioned data S and/or an identifier of the first vehicle 10 which is used in the wireless communication (for example, an IP address or a MAC address) and/or a license plate number of the first vehicle 10;

an identifier (or the type) of the anomaly detected (indicating, for example, which data item among the data S is considered to be abnormal, that is to say, inconsistent);

a confidence level associated with the anomaly detection (this confidence level being produced by the anomaly detection unit 26 in accordance with the conditions which have led to the anomaly detection);

the data which have led to the anomaly detection (for example, here the positions of the first vehicle 10 previously received and/or the position of the second vehicle 20, the comparison of which with the data item S received has led to the anomaly detection or, in a similar manner, the speed of the first vehicle 10 indicated in the data S, the comparison of which with the speed of the first vehicle measured by sensors of the second vehicle 20 has led to the anomaly detection) or proof of the anomaly;

a measurement of the detection capacity associated with the anomaly detection unit 26 (this measurement being, for example, connected with the types of sensors which are fitted to the station 22 or the second vehicle 20).

The control unit 12 which is fitted to the first vehicle 10 receives this report R at step E10 and can thus determine in accordance with the data contained in this report R if an action has to be put in place.

If so, as illustrated in FIG. 2, an action is carried out at step E12 under the control of the control unit 12.

Such an action may be a corrective action (that is to say, intended to repair the system which is considered to be defective), for example, an instruction to update the software of the system which is considered to be defective (here, the navigation system 16).

Such an action may be a preventive action, for example, an instruction for a system of the vehicle (such as the autonomous driving system 18) to change to a secure operating mode (or "fail-safe mode" according to the term sometimes used) or to a degraded operating mode (in which, for example, a specific system modifies the configuration thereof in order not to use a given information item). When such an instruction is received, the autonomous driving system 18 can, for example, deactivate the autonomous driving and thus give back control to the driver (if he/she is available) or instruct the vehicle to be stopped in a protected zone.

Such an action may also be inhibiting any automatic action by the electronic systems (in particular 11, 12, 14, 16, 18) of the first vehicle 10.

Such an action may also comprise deactivating and/or isolating (in other words, placing into quarantine) an on-board system which is affected by an attack (as determined, for example, on the basis of the report R mentioned above).

Such an action may comprise stopping the transmission of data via a wireless communication (for example, via the wireless communication mentioned above).

Such an action may also comprise returning to a secure configuration of the protection system 11.

Such an action may further comprise displaying an indication signaling the anomaly detected (mentioned in the report R) to the driver of the first vehicle 10.

In the example which has been described above, the station 22 is part of the second vehicle 20. In a variant, the station 22 could be integrated in another type of element of the road environment, for example, in a road infrastructure element.

FIG. 3 schematically illustrates another example of the context in which the invention can be carried out.

As in the case of FIG. 1, a first vehicle 110 and a second vehicle 120 are using the same traffic lane.

The first vehicle 110 comprises a control unit 112, a wireless communication module 114, a system 111 for protection against attacks, a navigation system 116, sensors 117 and an autonomous driving system 118. These elements are similar to those described above with reference to FIG. 1 and will therefore not be described again.

The second vehicle 120 is itself provided with a station 122 which comprises a wireless communication unit 124 and an anomaly detection unit 126. Again in this instance, these elements are similar to those described above in the context of FIG. 1.

In the context of FIG. 3, there is further provided a base station 140 which is capable of establishing a wireless communication with the wireless communication module 114 of the first vehicle 110 or with the wireless communication unit 124 of the second vehicle 120.

The base station 140 is further connected via a network 150 (which includes, for example, a public network, such as the Internet network) to a remote server 130. As will become evident below, this remote server 130 is a centralized remote administrator of the systems for protection against data-processing attacks (or RCCM/Remote Central CDS Manager). This server 130 aggregates and makes reliable the anomaly reports which have been submitted to it by all the different stations which have detected anomalies of the first vehicle 110.

As a result of these different communication means, the control unit 112 of the first vehicle 110 and the station 122 which is fitted to the second vehicle 120 can each exchange data with the remote server 130, in particular as explained below with reference to FIG. 4.

Furthermore, as in the context of the embodiment of FIGS. 1 and 2, the control unit 112 of the first vehicle 110 and the station 122 which is fitted to the second vehicle 120 can exchange data with each other via the communication established between the wireless communication module 114 and the wireless communication unit 124.

FIG. 4 illustrates an example of the method carried out in the context of FIG. 3.

This method begins at step E20 by transmitting data S via the first vehicle 110 to the second vehicle 120 and via the communication established between the wireless communication module 114 and the wireless communication unit 124.

These data S are, for example, data which are transmitted during normal operation by the first vehicle 110, such as:

state data, for example, the position of the first vehicle 110 (as determined by the navigation system 116) and/or the orientation of the first vehicle 110 (as determined by the navigation system 116 and/or the sensors 111) and/or the speed of the first vehicle 110 and/or the acceleration of the first vehicle 110 and/or the on/off state of at least one lighting device or signaling device and/or the position (typically the angle) of the steering wheel of the first vehicle 110 and/or a history of the route followed by the first vehicle 110 and/or the time stamp of the above-mentioned data (this time stamp being able to be carried out by means of a time information item supplied by the navigation system 116);

data for signaling danger, for example, signaling an accident or a breakdown or a dangerous zone (such as slippery road) or a weather phenomenon (such as fog) or a traffic congestion region or the presence of an object on the carriageway.

These data S are thus received by the second vehicle 120 (via the wireless communication unit 124) at step E22.

The anomaly detection unit 126 can thus analyze at step E24 these data S in order to in particular verify the consistency thereof and to detect an anomaly where applicable.

Such an anomaly may in particular be caused by a residual data-processing attack within one of the above-mentioned elements 112, 114, 116, 118 of the first vehicle 110. Such an anomaly may also be caused by an unsuitable action or reaction of this protection system.

The anomaly detection unit 126 can thus, for example, detect an anomaly (that is to say, an inconsistency) in the position of the first vehicle 110 (information received among the data S) by comparing this position with the position information items received beforehand from the first vehicle 110 and/or the position of the second vehicle 120 (as determined by systems belonging to the second vehicle 120).

As indicated above, the anomaly detection unit 126 can naturally analyze and verify the consistency of other types of data.

The anomaly detection unit 126 can thus instruct at step E26 the transmission, by the wireless communication unit 24 to the remote server 130 (via the base station 140, as explained above), of an anomaly message A which contains at least some of the following information items:

an identifier (or the type) of the anomaly detected (indicating, for example, which data item among the data S is considered to be abnormal, that is to say, inconsistent);

an identifier of the first vehicle 110 (vehicle which transmits data S among which an anomaly is detected), for example, an identifier of the first vehicle 110 which is contained in the above-mentioned data S and/or an identifier of the first vehicle 110 which is used in the wireless communication (for example, an IP address or a MAC address) and/or the license plate number of the first vehicle 110;

a confidence level associated with the anomaly detection (this confidence level being produced by the anomaly detection unit 126 in accordance with the conditions which have led to the anomaly detection);

the data which have led to the anomaly detection (for example, here the positions of the first vehicle 110 previously received and/or the position of the second vehicle 120, the comparison of which with the data item S received has led to the anomaly detection) or proof of the anomaly;

a measurement of the detection capacity associated with the anomaly detection unit 126 (this measurement being, for example, connected with the types of sensors which are fitted to the station 22 or the second vehicle 20).

The remote server 130 receives the anomaly message A at step E28 and processes this anomaly message A at step E30.

This processing may involve, for example, comparing or cross-checking the anomaly which is signaled by the anomaly message A with other anomalies which are signaled where applicable by other stations with regard to the same vehicle (here, the first vehicle 110).

On the basis of the processing of the step E30 (which uses the data which are contained in the anomaly message A and where applicable other anomaly data which relate to the vehicle which is identified by the identifier contained in the anomaly message A), the remote server 130 can decide to generate and transmit (step E32) to the first vehicle 110 (affected by the anomaly detected) a report R which contains at least some of the following data:

an identifier of the anomaly detected (indicating, for example, which data item among the data S is considered to be abnormal, that is to say, inconsistent);

a confidence level associated with the anomaly detected (this confidence level being determined by the remote server 130, for example, in accordance with confidence levels which are contained in various messages, respectively, which are received by the remote server 130 and the number of such messages which signal this anomaly);

a description of the potential origin of the problem which produced the anomaly (potential origin determined by the remote server 130): for example, the origin of the problem is indicated as being one of the systems of the first vehicle 110, such as the navigation system 116, which has been the victim of an attack;

a recommended action (also determined by the remote server 130).

It will be noted that the remote server 130 can in practice process a plurality of anomaly detection messages which are received from a plurality of stations, respectively, and can derive the report R therefrom on the basis of these anomaly detection messages.

The remote server 130 can further transmit a message to the driver of the first vehicle 110 in order to signal to this driver the anomaly detected. This message may be a short message or an electronic message. In a variant, the message may be addressed by mail, for example, by registered mail. Such a message may be, for example, transmitted and displayed on a mobile terminal of the driver, who may, for example, take notice thereof when the first vehicle 110 is in autonomous driving mode. This message may, for example, recommend that the driver should deactivate the autonomous driving mode and take back control of driving the first vehicle 110.

The control unit 112 which is fitted to the first vehicle 110 receives the report R mentioned above at step E34 and can thus determine in accordance with the data contained in this report R whether an action must be put in place.

The processing carried out by the control unit 112 may be in accordance with this report R, particularly since the report R is from a remote server 130 and can thus take account of data which are collected from a plurality of stations which are adjacent to the first vehicle 110.

An action (for example, a recommended action contained in the report R) can thus be carried out at step E36 under the control of the control unit 112.

Such an action may be a corrective action (that is to say, intended to repair the system which is considered to be defective), for example, an instruction to update the software of the system which is considered to be defective (here, the navigation system 116).

Such an action may be a preventive action, for example, an instruction for a vehicle system (such as the autonomous driving system 118) to change to a secure operating mode (or "fail-safe mode" according to the term sometimes used) or to a degraded operating mode (in which, for example, a specific system modifies the configuration thereof in order not to use a given information item). When such an instruction is received, the autonomous driving system 118 can, for example, deactivate the autonomous driving and thus give back control to the driver (if he/she is available) or instruct the vehicle to be stopped in a protected zone.

Such an action may also be inhibiting any automatic action by the electronic systems (in particular 112, 114, 116, 118) of the first vehicle 110.

Such an action may also comprise deactivating and/or isolating (in other words, placing into quarantine) an on-board system which is affected by an attack (as determined, for example, on the basis of the report R mentioned above).

Such an action may comprise stopping the transmission of data via a wireless communication (for example, via the wireless communication mentioned above).

Such an action may also comprise returning to a secure configuration of the protection system 111.

Such an action may further comprise displaying an indication signaling the anomaly detected (mentioned in the report R) to the driver of the first vehicle 110.

In the example which has been described above, the station 122 is part of the second vehicle 120. In a variant, the station 122 could be integrated in another type of element of the road environment, for example, in a road infrastructure element. The station 122 could in this case be, for example, integrated in the base station 140.

The invention claimed is:

1. A method for transmitting a report to a first vehicle comprising:

detecting, by a station that is in a second vehicle in proximity with the first vehicle within a maximum distance, an anomaly relating to the first vehicle;

transmitting to the first vehicle a report relating to the anomaly detected;

carrying out one or more actions within the first vehicle in response to reception of the report, the one or more actions being recommended based on the anomaly detected; and receiving, by the station and via a wireless communication between the station and the first vehicle, data from the first vehicle, wherein the one or more actions comprises deactivating an autonomous driving mode of the first vehicle to transfer operational control to the driver of the first vehicle, wherein the report comprises a measurement of a detection capacity associated with of one or more anomaly detection sensors that are fitted to the station for anomaly detection of the station, wherein the report is transmitted to the first vehicle by a remote server, wherein the remote server is configured to process a plurality of anomaly detection messages which are received from a plurality of stations, respectively, and to derive the report therefrom, wherein the remote server is configured to cross-check the plurality of anomaly detection messages with at least one other plurality of anomaly detection messages which are signaled where applicable by other stations, wherein the anomaly detected by the station comprises an anomaly within the data received from the first vehicle, and wherein the anomaly comprises an abnormal, unusual, or suspicious physical behavior of the first vehicle, or at least in part is caused by a residual data-processing attack within the first vehicle.

2. The method as claimed in claim 1, wherein the report is transmitted via a wireless communication between the station and the first vehicle.

3. The method as claimed in claim 2, wherein the remote server is configured to transmit a message which is intended for the driver or the owner of the first vehicle and which signals the anomaly detected.

4. The method as claimed in claim 2, wherein the station is configured to transmit an anomaly detection message to the remote server.

5. The method as claimed in claim 1, wherein the one or more actions further comprises at least one of the following:

updating a software item which is on-board the first vehicle; and stopping the transmission of the data via a wireless communication.

6. The method as claimed in claim 1, further comprising transmitting a warning message inside the first vehicle.

7. The method as claimed in claim 1, wherein the report further comprises at least one information item selected from among the following information items: a confidence level associated with the anomaly detected, an identifier of the anomaly which is detected, a type of the anomaly detected, a recommended action, proof of the anomaly detected, and information items relating to the first vehicle.

8. The method as claimed in claim 1, wherein the station is fitted to a road infrastructure item.

9. The method as claimed in claim 1, wherein the station is fitted to a portable electronic device.

10. The method as claimed in claim 1, wherein the residual data-processing attack within the first vehicle is a data-processing attack which has not been correctly dealt with and is caused by data exchanges carried out with external devices via the wireless communication.

* * * * *